(12) United States Patent
Lin

(10) Patent No.: US 8,294,885 B2
(45) Date of Patent: Oct. 23, 2012

(54) AUXILIARY DEVICE FOR HELPING TO MEASURE COAXIALITY OF LENSES

(75) Inventor: Tsung-Yu Lin, Taipei Hsien (TW)

(73) Assignee: Hon Hai Precision Industry Co., Ltd., Tu-Cheng, New Taipei (TW)

( * ) Notice: Subject to any disclaimer, the term of this patent is extended or adjusted under 35 U.S.C. 154(b) by 239 days.

(21) Appl. No.: 12/854,906

(22) Filed: Aug. 12, 2010

(65) Prior Publication Data

US 2011/0255079 A1 Oct. 20, 2011

(30) Foreign Application Priority Data

Apr. 19, 2010 (TW) ................................ 99112200 A

(51) Int. Cl.
*G01B 9/00* (2006.01)
(52) U.S. Cl. ......... 356/124; 356/127; 359/811; 359/819

(58) Field of Classification Search .......... 256/124–127; 359/819, 365, 796, 642, 811
See application file for complete search history.

(56) References Cited

U.S. PATENT DOCUMENTS

| | | | | |
|---|---|---|---|---|
| 5,548,396 A | * | 8/1996 | Morita et al. | 356/127 |
| 7,540,982 B2 | * | 6/2009 | Shyu et al. | 264/1.32 |
| 7,916,410 B1 | * | 3/2011 | Lin et al. | 359/819 |
| 8,253,839 | * | 8/2012 | Chang | 348/335 |
| 2009/0168204 A1 | * | 7/2009 | Nishizawa et al. | 359/796 |

* cited by examiner

*Primary Examiner* — Hoa Pham
(74) *Attorney, Agent, or Firm* — Altis Law Group, Inc.

(57) ABSTRACT

An auxiliary device for measuring the coaxiality of a lens. The auxiliary device includes a cylindrical main body having a first surface and a flat second surface facing away the first surface, and a protrusion formed on the first surface and defining a reference convex surface. The second surface of the main body defines a position part. The position part is coaxial with the reference convex surface and configured to engage with the lens to measure the coaxiality of the lens.

2 Claims, 1 Drawing Sheet

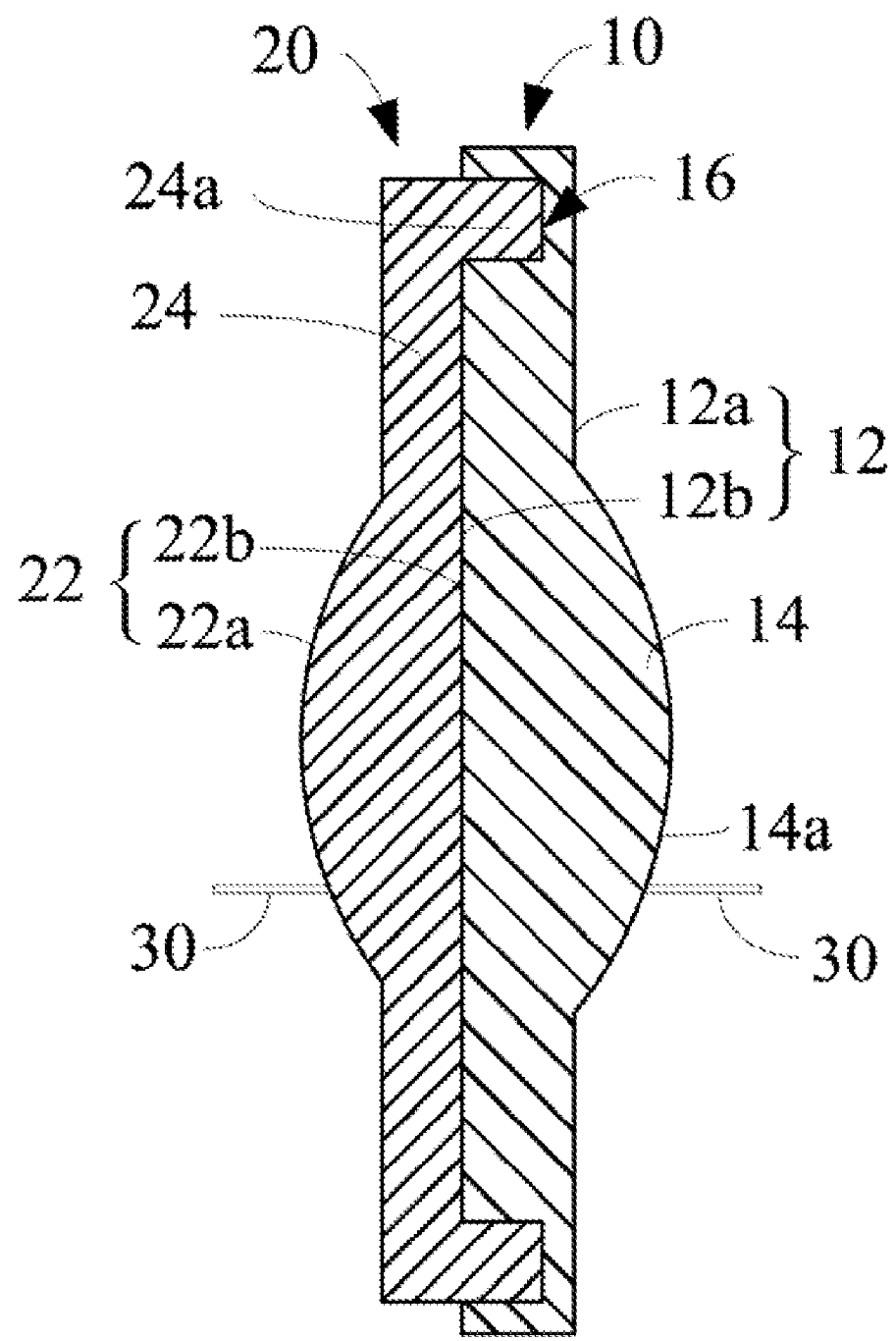

AUXILIARY DEVICE FOR HELPING TO MEASURE COAXIALITY OF LENSES

BACKGROUND

1. Technical Field

The present disclosure relates to measuring devices, and particularly, to an auxiliary device for helping to measure coaxiality of lenses having a curved surface and a flat surface opposite to the curved surface.

2. Description of Related Art

To obtain high imaging quality, it is required that the two optical surfaces are strictly coaxial. However, it is difficult to machine a mold in which a lens is made having two precise coaxial optical surfaces, limited to manufacturing precision. Before obtaining the coaxiality of the lens, an eccentricity of the lens should be measured. Currently, lenses with a curved optical surface and a flat optical surface have been proposed. With the lack of one curved optical surface, the eccentricity of the lens cannot be measured directly.

Therefore, it is desirable to provide an auxiliary device for helping to measure coaxiality of lenses which can overcome the above-mentioned shortcomings.

BRIEF DESCRIPTION OF THE DRAWING

Many aspects of the present disclosure should be better understood with reference to the following drawing. The components in the drawing are not necessarily drawn to scale, the emphasis instead being placed upon clearly illustrating the principles of the present disclosure.

The FIGURE is a cross-sectional view of a lens mounted on the auxiliary device for helping to measure the coaxiality of the lens, according to an exemplary embodiment.

DETAILED DESCRIPTION

The embodiment of the present disclosure will now be described in detail with reference to the drawing.

Referring to the FIGURE, a lens 20, according to an exemplary embodiment, includes an optical portion 22 and a non-optical portion 24 surrounding the optical portion 22. The optical portion 22 includes a curved optical surface 22a (e.g., convex) and a flat optical surface 22b opposite to the curved optical surface 22a. The non-optical portion 24 forms an annular first position part 24a protruding outward therefrom along a direction parallel to the optical axis of the optical portion 22, surrounding the flat optical surface 22b. The first position part 24a is coaxial with the optical portion 22. In the present embodiment, the first position part 24a is a continuous ring.

The auxiliary device 10 is configured for helping to measure the eccentricity of the lens 20. The auxiliary device 10, according to one embodiment, includes a cylindrical main body 12 and a protrusion 14. The main body 12 has a first surface 12a and a flat second surface 12b opposite to the first surface 12a. The second surface 12b defines an annular second position part 16 corresponding to the first position part 24a. In the present embodiment, the second position part 16 is a ring-shaped groove that is sunk into the second surface 12b. The protrusion 14 is formed on the first surface 12a, and has a reference convex surface 14a facing away from the second surface 12b. The axis of the reference convex surface 14a (not shown) coincides with that of the second position part 16. The auxiliary device 10 is precisely positioned on the lens 20 by the engagement of the first position part 24a and the second position part 16. To ensure that the reference convex surface 14a is coaxial with the second position part 16, the auxiliary device 10 may be made by precision cutting. The auxiliary device 10 may be made of a solid material, such as plastic or metal.

In operation, the auxiliary device 10 is coupled to the lens 20 in a manner that the first position part 24a engages with the second position part 16. In this way, the flat optical surface 22b substantially coincides with and contacts the second surface 12b. As such, the auxiliary device 10 is precisely coaxial with the first position part 24a. Then, the probes 30 of a eccentricity measuring device (not shown) resist on the curved optical surface 22a of the lens 20 and the reference convex surface 14a of the auxiliary device 10 to measure the eccentricity of the curved optical surface 22a with reference to the reference convex surface 14a. Therefore, the coaxiality between the curved optical surface 22a and the first position part 24 can be a further gained.

It will be understood that the first position part 24a and the second position part 16 are configured for ensuring the coaxiality between the reference convex surface 14a of the auxiliary device 10 and the flat optical surface 22b of the lens 20. However, the first position part 24a and the second position part 16 are not limited to the present embodiment.

It will be understood that the above particular embodiments and methods are shown and described by way of illustration only. The principles and the features of the present disclosure may be employed in various and numerous embodiment thereof without departing from the scope of the disclosure as claimed. The above-described embodiments illustrate the scope of the disclosure but do not restrict the scope of the disclosure.

What is claimed is:

1. An auxiliary device for measuring the coaxiality of a lens, the auxiliary device comprising:
    a cylindrical main body comprising a first surface and an entirely flat second surface facing away from the first surface, and
    a protrusion positioned on the first surface and defining a reference convex surface;
    wherein the second surface of the main body defines a position part, the position part is a ring-shaped groove defined in the second surface, the position part is coaxial with the reference convex surface and configured to engage with the measured lens to measure the coaxiality of the measured lens.

2. The auxiliary device of claim 1, wherein the auxiliary device is made of plastic or metal.

* * * * *